United States Patent
Szum et al.

(10) Patent No.: US 6,187,835 B1
(45) Date of Patent: Feb. 13, 2001

(54) RADIATION-CURABLE OPTICAL FIBER COATINGS HAVING REDUCED YELLOWING AND FAST CURE SPEED

(75) Inventors: David M. Szum, Elmhurst; Chander P. Chawla, Batavia; Timothy E. Bishop, Algonquin, all of IL (US)

(73) Assignee: DSM N.V., Heerlen (NL)

( * ) Notice: Under 35 U.S.C. 154(b), the term of this patent shall be extended for 0 days.

(21) Appl. No.: 09/099,198

(22) Filed: Jun. 18, 1998

Related U.S. Application Data

(60) Provisional application No. 60/050,033, filed on Jun. 18, 1997.

(51) Int. Cl.$^7$ .................................. C08F 2/48; C08F 2/50; B32B 17/02; B32B 17/06; B32B 17/10
(52) U.S. Cl. .............................. 522/96; 522/75; 522/120; 522/121; 522/142; 522/144; 522/137; 522/79; 522/71; 428/375; 428/378; 428/30; 428/426; 428/441
(58) Field of Search ................... 522/96, 75, 120, 522/121, 142, 144, 137, 79, 71; 428/375, 378, 30, 426, 441

(56) References Cited

U.S. PATENT DOCUMENTS

| | | | |
|---|---|---|---|
| 4,129,667 | * 12/1978 | Lorenz et al. | 427/44 |
| 4,263,366 | * 4/1981 | Lorenz et al. | 428/332 |
| 4,276,136 | * 6/1981 | Gruber et al. | 204/159.22 |
| 4,472,019 | * 9/1984 | Bishop et al. | 350/96.3 |
| 4,482,204 | * 11/1984 | Blyler, Jr. et al. | 350/96.34 |
| 4,528,311 | * 7/1985 | Beard et al. | 524/91 |
| 4,611,061 | * 9/1986 | Beard et al. | 548/260 |
| 4,935,455 | 6/1990 | Huy et al. | |
| 5,015,068 | 5/1991 | Petisce | |
| 5,141,990 | 8/1992 | McKoy et al. | |
| 5,384,235 | * 1/1995 | Chen et al. | 430/512 |
| 5,539,014 | * 7/1996 | Swedo et al. | 522/91 |
| 5,664,041 | * 9/1997 | Szum et al. | 385/128 |

FOREIGN PATENT DOCUMENTS

| | | | |
|---|---|---|---|
| 114 982 B1 | * 8/1984 | (EP) . | |
| 114 982 | * 6/1987 | (EP) . | |
| 84-03085 | 8/1994 | (WO) . | |
| 95/23120 | * 8/1995 | (WO) . | |

OTHER PUBLICATIONS

Database WIPI, Section Ch, Week 8819, Derwent Publications Ltd., London, GB; Class A60, & JP 63 070210 A (Hitachi Cable Ltd), Mar. 30, 1988.

Database WPI, Section Ch, Week 9119 Derwent Publications Ltd., London, GB; Class A26, & JP 03 074463 A (Toshiba Silicone KK), Mar. 29, 1991.

* cited by examiner

*Primary Examiner*—James J. Seidleck
*Assistant Examiner*—Sanza McClendon
(74) *Attorney, Agent, or Firm*—Pillsbury Madison & Sutro LLP Intellectual Property Group

(57) ABSTRACT

Radiation-curable inner and outer primary optical fiber coatings are disclosed having both fast cure speed and reduced rates of yellowing. The compositions comprise particular photoinitiators and UV absorbers which are used in amounts to provide the combination of properties. The UV absorber can have ethylenic unsaturation. Outer primary coatings can be formulated to screen inner primary coatings and have fast cure speed.

17 Claims, 12 Drawing Sheets

EFFECT OF SANDOVUR VSU ON COLOR CHANGE

EFFECT OF ABSORBER ON CURE SPEED

3 DAY FLUORESCENT AGING

7 DAY FLUORESCENT AGING

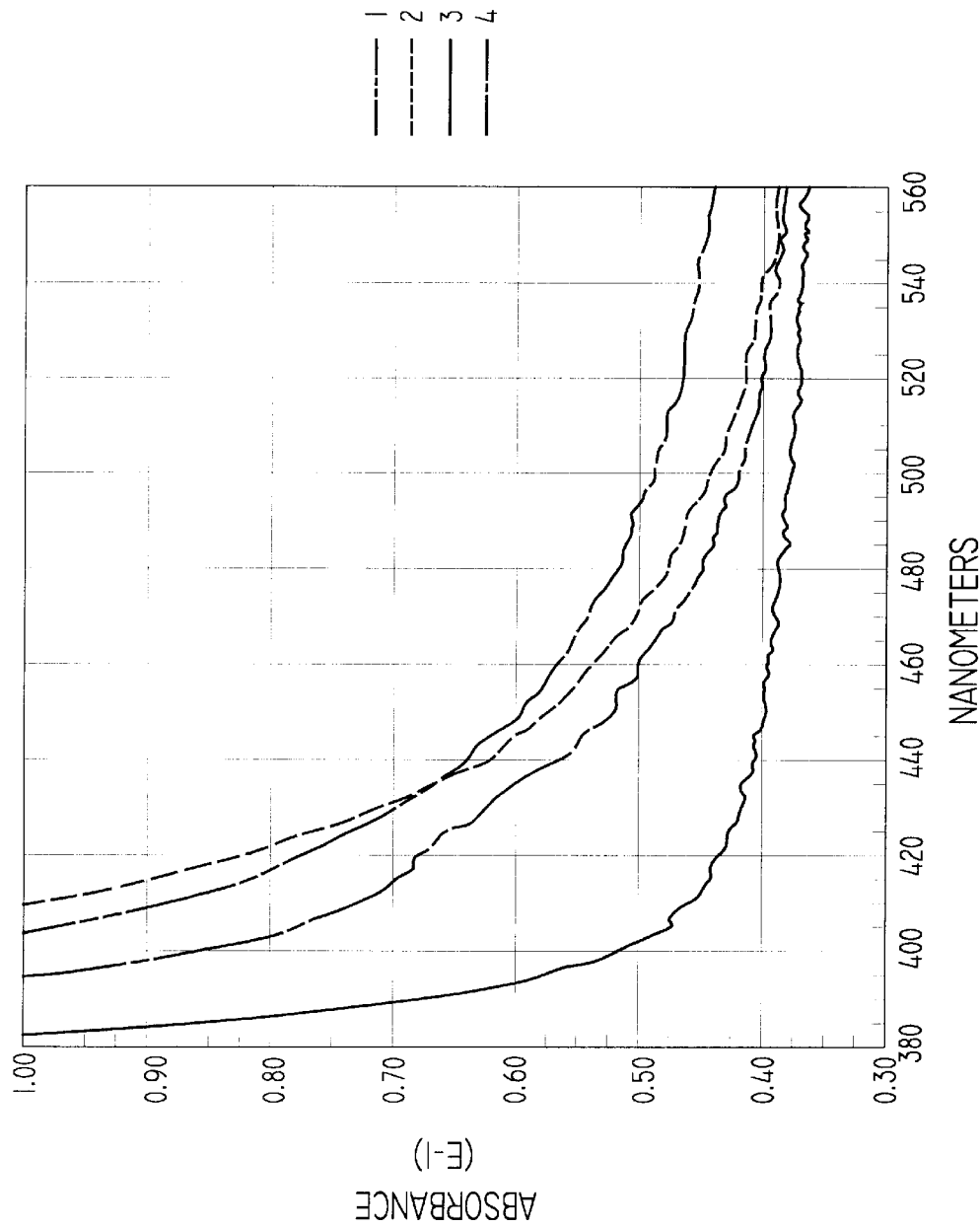

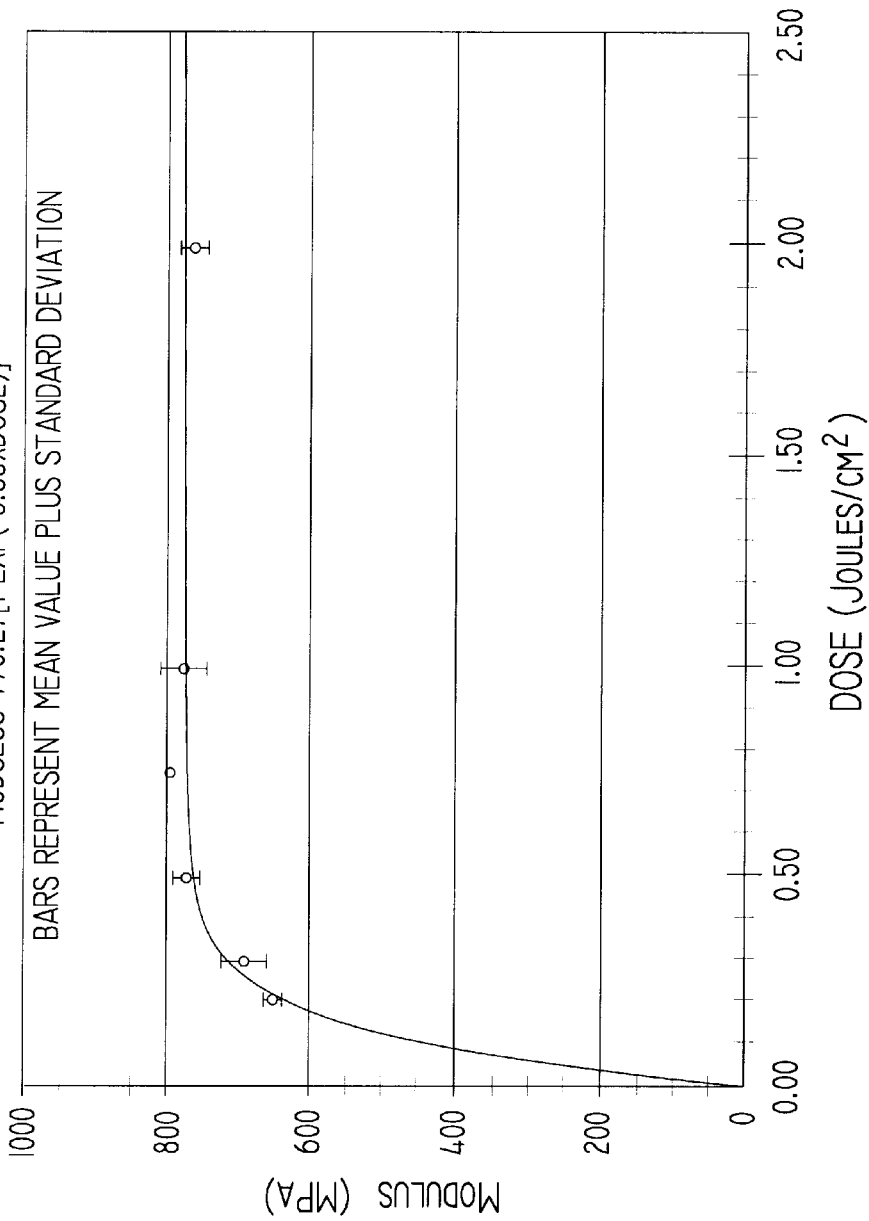

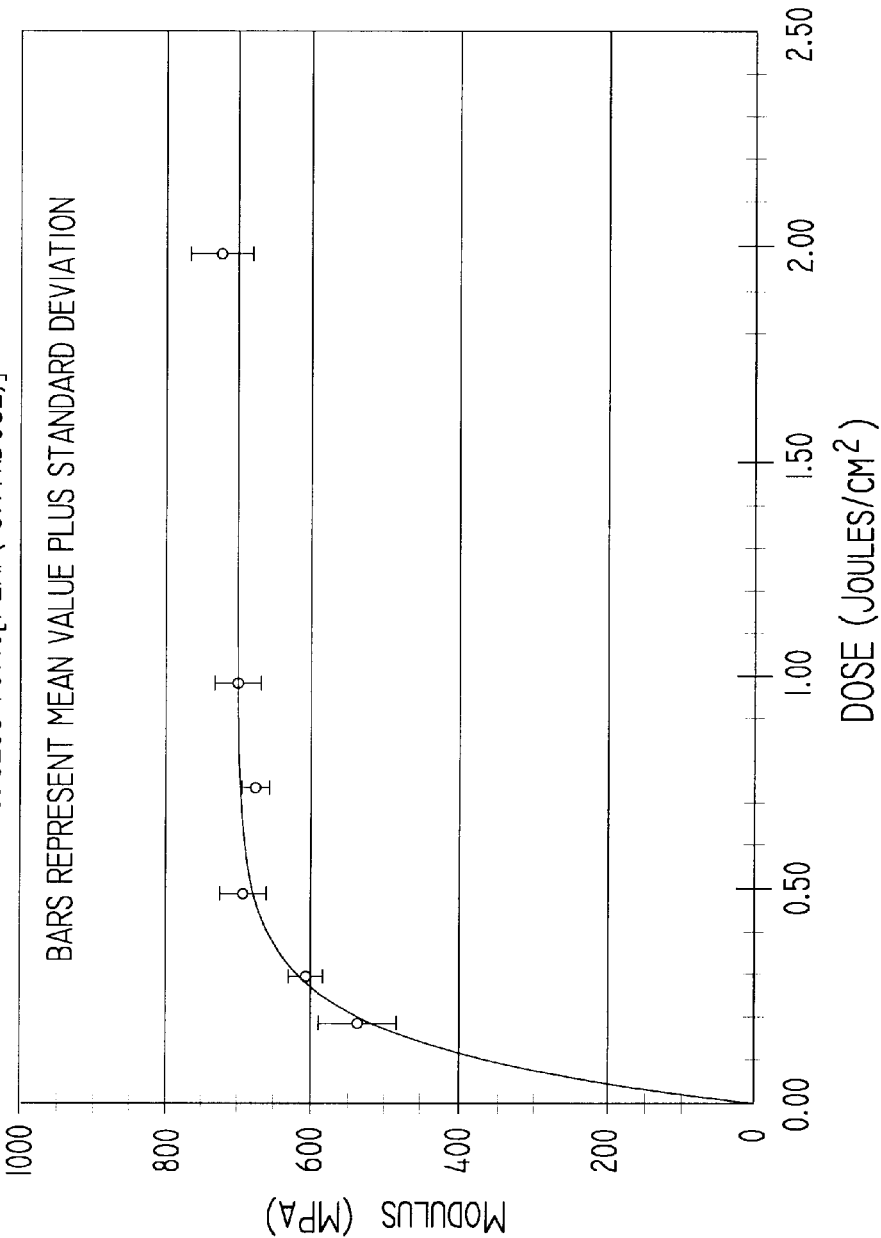

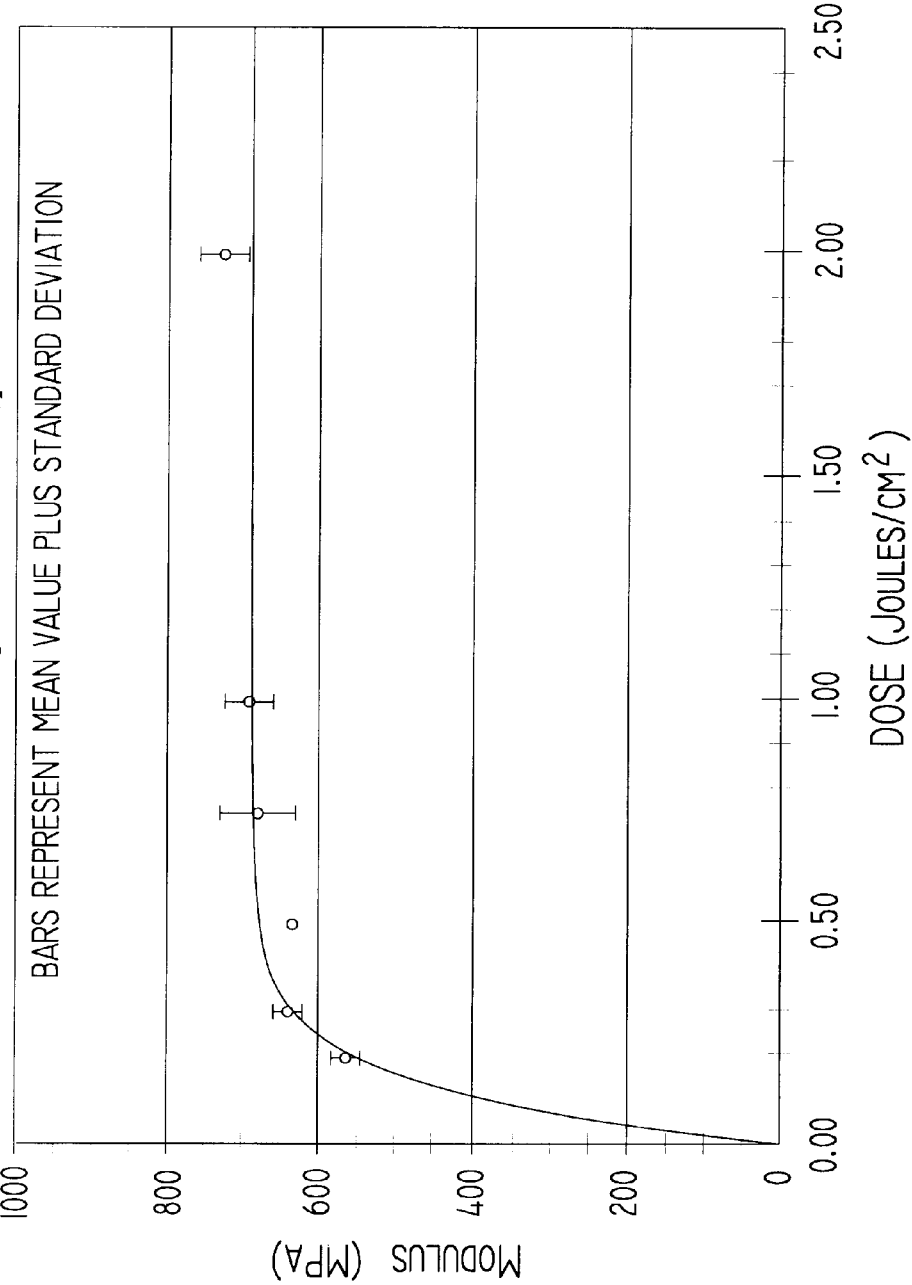

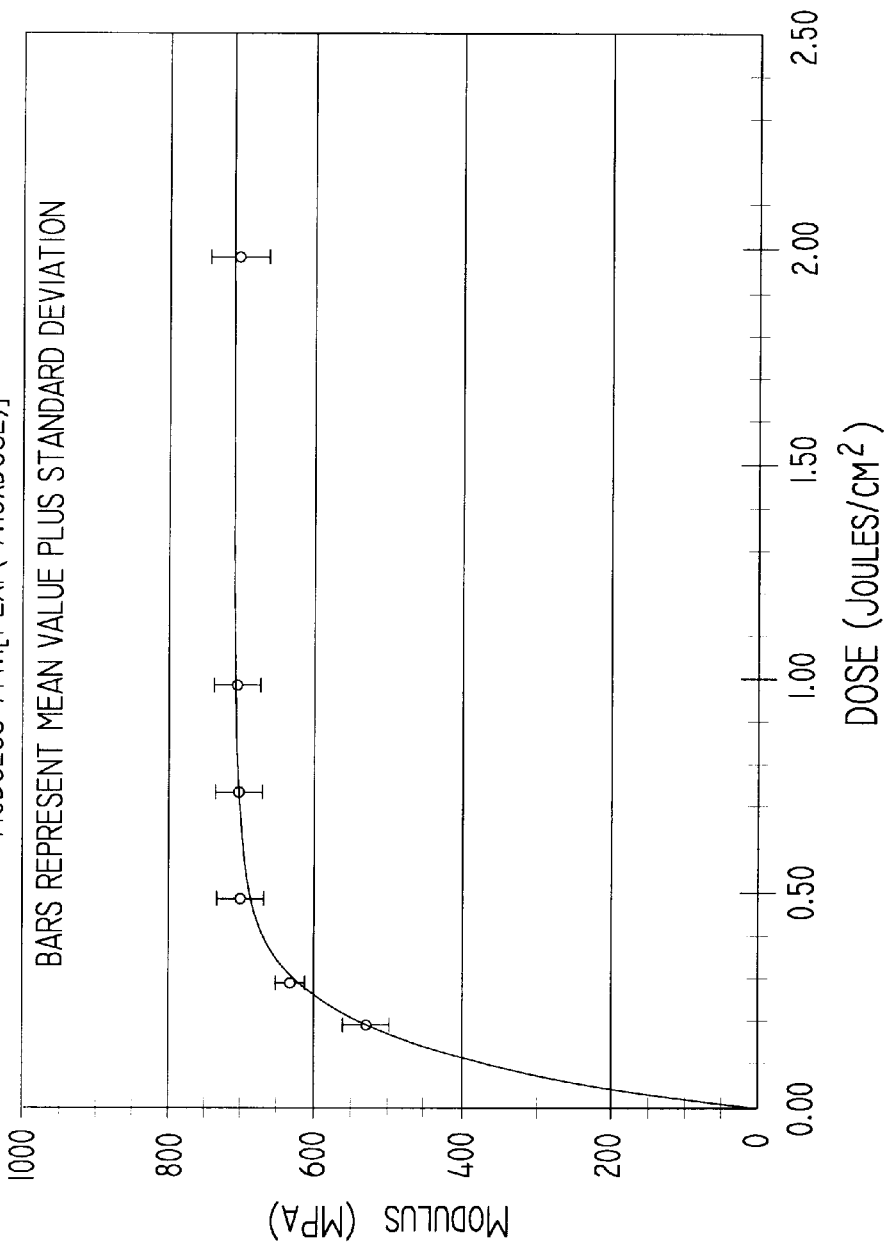

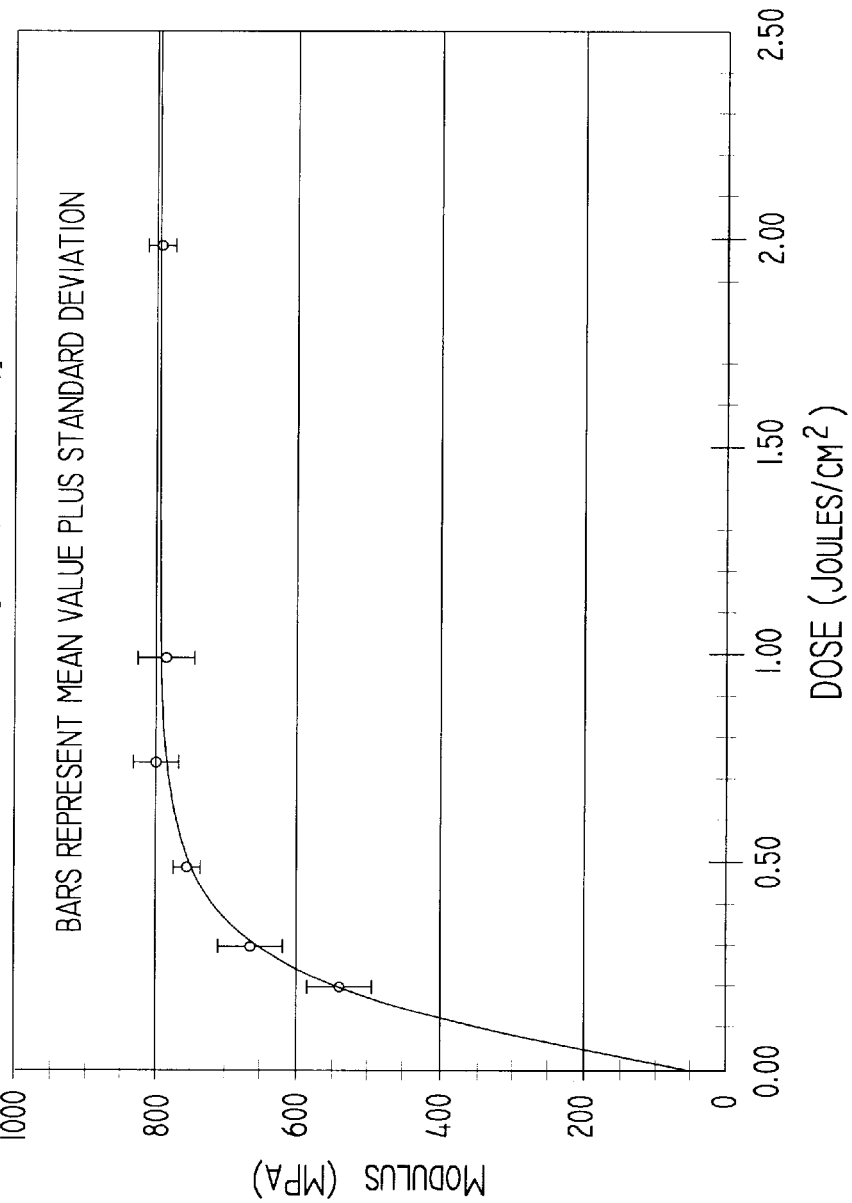

RADIATION-CURABLE OPTICAL FIBER COATINGS HAVING REDUCED YELLOWING AND FAST CURE SPEED

This application claims the benefit of U.S. Provisional Application No. 60/050,033, filed Jun. 18, 1997.

FIELD OF THE INVENTION

The invention relates to radiation-curable optical fiber coating compositions. In particular, the invention relates to compositions which are both fast-curing and have, upon radiation-cure, reduced rates of yellowing upon accelerated aging.

DESCRIPTION OF THE RELATED ART

Optical fibers have become a medium of choice for transmitting information in the modern telecommunications era. Immediately after their manufacture, optical fibers are usually coated with a radiation-curable inner primary coating (or simply "primary coating") which directly contacts the underlying optical fiber. After radiation-cure, this inner primary coating is relatively soft and susceptible to damage. Therefore, the fiber is also usually coated with a radiation-curable outer primary coating (or simply "secondary coating") which overlays the inner primary coating and is stiffer than the soft inner primary coating. This dual coating structure maximizes fiber transmission efficiency and durability and preserves the desirable characteristics of freshly-prepared, pristine glass fiber. The two coatings must function together to maximize fiber performance. In many cases, radiation-curable inks are applied over the outer primary coatings before the coated fibers are further processed into ribbons and cables. Besides the two fiber coatings, other radiation-curable fiber optic materials include matrix and bundling materials which are used to construct ribbons and cables.

After their cure, the radiation-curable compositions used in optical fiber production should not substantially change color over time, and in particular, should not yellow. Non-yellowing has become a crucial coating parameter in the optical fiber industry. Discoloration and yellowing is particularly encouraged by photolytic aging (e.g., aging in the presence of UV or fluorescent light). Also, discoloration is a general problem with urethane acrylate-based compositions, now the industry standard, and tends to be a greater problem with the inner primary rather than outer primary coatings. Yellowing in either coating, however, is undesirable.

Fast cure speed also remains an important coating parameter. Fiber production is limited by the rate at which the coatings can be sufficiently cured. Inner primary coatings usually have slower cure speeds than outer primary coatings.

Although attempts have been made to solve the aforementioned yellowing problem, any solution should be arrived at without impairing other important properties such as fast cure speed. That combination of properties, however, can be difficult to achieve. In addition, coating design is complicated by the effects of the outer primary coating on the cure of the inner primary coating. Systemic approaches are needed to solve these problems and satisfy stringent demands made by producers of coated optical fibers, ribbons, and cables. These producers demand both fast cure speed and non-yellowing performance from the coating system which prior art coatings do not provide.

UV absorbing compounds ("UV absorbers") have been added to optical fiber coatings, but with mixed results. It is generally recognized that they slow cure speed. For example, U.S. Pat. Nos. 5,146,531 and 5,527,835 teach optical fiber coatings which allegedly are suitably non-yellowing and have suitable cure speed. However, the use of UV absorbing compounds is not taught in these patents.

U.S. Pat. No. 4,482,204 to Blyler et al. discloses that optical loss in the fiber can be reduced if the radiation-curable fiber coatings comprise a UV-absorbing additive which functions to screen UV light (but, unlike a photoinitiator, does not generate substantial amounts of free radicals upon UV exposure). According to this patent, however, the UV absorbing material is preferably located in the inner primary coating, and is not used in the outer primary coating if a fully-cured outer primary coating is desired. This patent also does not suggest the preparation of fast cure speed outer primary coatings which reduce yellowing of the inner primary coating through use of a UV absorber. Rather, it teaches away from the use of a UV absorber in the outer primary coating if fast cure speed is desired.

Similarly, U.S. Pat. No. 4,935,455 teaches use of UV absorber in an inner primary coating. However, this patent also teaches that increasing the amount of UV absorber will slow cure speed. Hence, it exemplifies use of UV absorber only in low amounts.

Therefore, in general, UV absorbers are considered undesirable when fast cure is essential, and commercial optical fiber coatings today generally do not include them. Past commercial optical fiber coatings have employed them, but in very low concentrations. These coating systems are inadequate to meet present commercial demands.

In sum, a long-felt need exists for fast-curing inner and outer primary coatings which provide both enhanced protection against light-induced discoloration and fast cure speed.

SUMMARY OF THE INVENTION

The present invention recognizes that the aforementioned problems with optical fiber coatings can be resolved by tailoring the coating's photoinitiator system together with a UV absorbing system. In addition, inner and outer primary coating compositions can be designed to function together. As a result, this invention helps fulfill a long-felt need in the industry to provide optical fiber coating systems with both fast cure speed and non-yellowing properties.

The present invention provides a radiation-curable composition for an optical fiber coating comprising the combination of pre-mixture ingredients:

about 5 wt. % to about 95 wt. % of at least one radiation-curable oligomer, about 5 wt. % to about 95 wt. % of at least one reactive diluent, about 0.1 wt. % to about 20 wt. % of at least one photoinitiator, wherein the photoinitiator is selected to provide a fast cure speed, about 0.1 wt. % to about 20 wt. % of at least one UV absorbing compound which does not substantially impair the fast cure speed.

The present invention also provides a coated optical fiber comprising the combination of:

an optical fiber, a radiation-cured inner primary optical fiber coating, and a radiation-cured outer primary optical fiber coating, wherein said outer primary optical fiber coating comprises, before radiation-cure:
about 5 wt. % to about 95 wt. % of at least one radiation-curable oligomer,
about 5 wt. % to about 95 wt. % of at least one reactive diluent,
about 0.1 wt. % to about 20 wt. % of at least one photoinitiator, wherein the photoinitiator is selected to provide a fast cure speed,
about 0.1 wt. % to about 20 wt. % of at least one UV absorbing compound which does not substantially impair the fast cure speed of the inner or outer primary coating.

The present invention also provides a method for reducing the rate of color degradation in an inner primary optical fiber coating comprising the combination of steps of:
coating an optical fiber with a radiation-curable inner primary coating,
coating the inner primary coating with an outer primary coating which comprises a UV absorber which does not substantially impair the cure speed of the outer primary coating, and
curing the coatings.

In particular, the outer primary coating compositions of the invention advantageously exhibit good cure speed, and after curing, demonstrate non-yellowing, oxidative stability, good moisture resistance, and tough film properties.

BRIEF DESCRIPTION OF THE DRAWINGS

FIGS. 4–7 illustrate the effect of UV absorber in the outer primary coating on the increased yellowing which occurs upon aging for combinations of inner and outer primary coatings.

FIGS. 8–12 illustrate the effect of dose on the modulus of the coating compositions of Examples 5A–5E as shown in Table VIII.

DETAILED DESCRIPTION OF PREFERRED EMBODIMENTS

Figure 1:
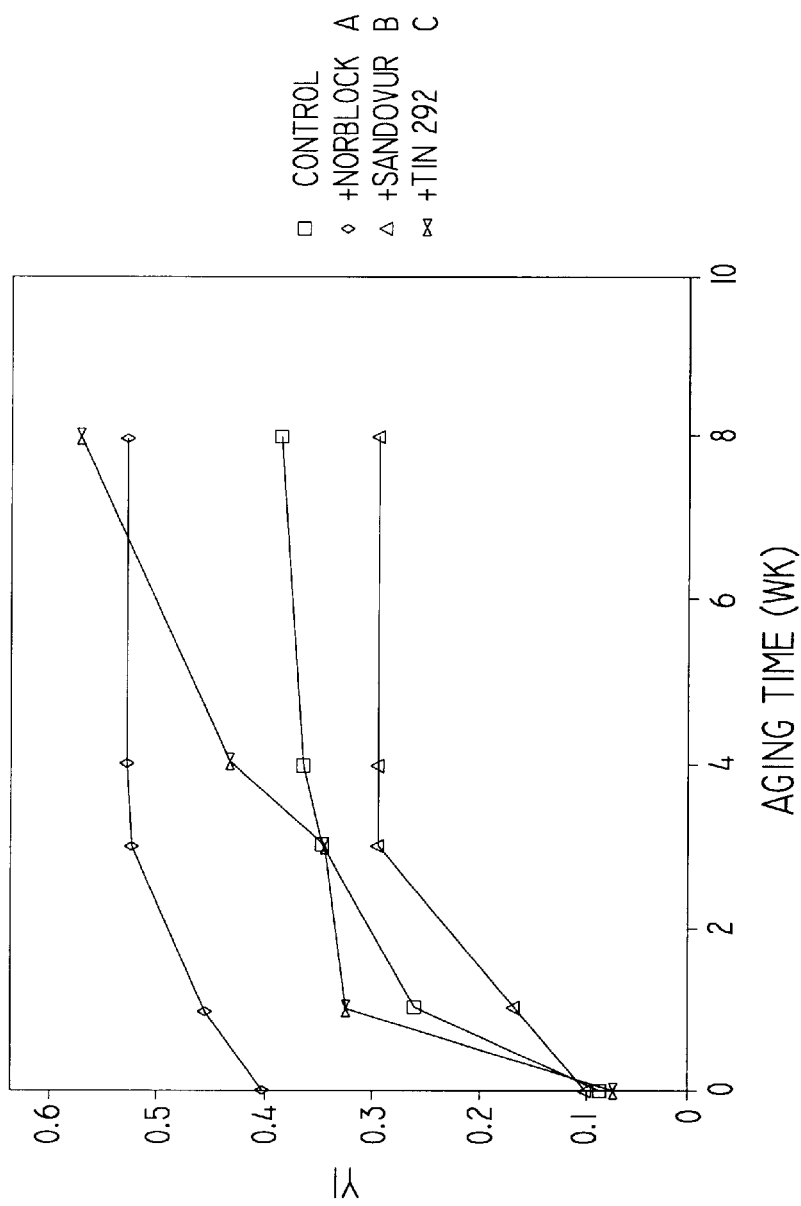
FIGS. 1–2 illustrate the effect of UV absorber on the rate of yellowing for inner primary coatings.

The following definitions apply to the present invention:

"(Meth)acrylate" means acrylate and/or methacrylate. Acrylate is generally preferred over methacrylate to achieve fast cure speed, but methacrylate can also be used.

"Pre-mixture ingredient" means the ingredient before it is mixed with other ingredients. Pre-mixture ingredients may have the ability to interact or react with each other after mixing.

"Effective amount" means that a person skilled in the art can determine the amount based on the particular coating system. For example, an amount of photoinitiator may depend on the activity of the photoinitiator or the non-yellowing character of the photoinitiator. Also important is whether the coating is an inner or outer primary coating, and whether the fiber production process for which the coating is designed is a simultaneous or sequential cure process. Similarly, an effective amount of UV absorber may depend on the absorption properties of the particular UV absorber.

Radiation-curable inner and outer primary coatings can comprise at least one radiation-curable oligomer, at least one reactive or monomer diluent, photoinitiator, and additives including a UV absorbing compound. The UV-absorbing compound can be in the inner primary coating, the outer primary coating, or both. In one preferred embodiment, the UV-absorbing compound is present in the outer primary coating and serves to screen the inner primary coating from the harmful effects of UV light. The outer primary coating also comprises at least one photoinitiator which is a fast cure photoinitator and provides for fast cure speed despite the presence of the UV absorber.

A radiation-curable composition is "sufficiently cured" when cure has proceeded to the extent that modulus has reached at least about 90% of its maximum value at full cure. In general, such a cure degree is sufficient to allow for commercial production of optical fiber. In most cases, however, the degree of cure should be maximized. It is preferred that the compositions, after sufficient cure, have a minimal amount of solvent extractable content.

As used herein, a "ultraviolet absorbing compound" or "UV absorber" is differentiated from a "photoinitiator" on the basis of the cure rate of the radiation-curable compositions which comprise these ingredients. A UV absorber does not substantially increase the cure rate of the composition, whereas a photoinitiator does increase cure rate by, for example, generating free radicals. UV absorbers in general can convert the absorbed ultraviolet light energy into heat. Alternatively, absorbed energy in a UV absorber can be dissipated through fluorescence or phosphorescence. However, UV absorbers which dissipate energy by heat are preferred. The distinction between a photoinitiator, which accelerates photopolymerization, and a UV absorber additive, which serves to prevent degradation, is well-recognized in the art.

UV absorbers are preferably selected which screen or absorb UV light so as to maximize the cure speed of the coating system and yet minimize the yellowing of the coating system. A balancing of these effects can be achieved for a particular application depending on, for example, the UV absorption bands of the inner and outer primary coating, the UV absorption bands of the inner and outer primary coating photoinitiators, the amount of photoinitiator in the inner and outer primary coating, and the relative strength of the UV absorber and photoinitiator absorption bands.

For example, the UV absorption spectrum of the outer primary UV absorber preferably has absorption bands which do not substantially compete with (overlap) the absorption bands of the photoinitiator in the inner and outer primary coating, and in particular, the outer primary coating. When some competition between photoinitiator and UV absorber cannot be avoided, the amount of photoinitiator can be increased as necessary to overcome the absorption effect of the UV absorber and maintain cure speed.

Also, the UV absorber can be selected to absorb light which induces yellowing, particularly in the inner primary coating. Light which induces yellowing can be associated with the absorption bands of, for example, the inner primary coating. Hence, the UV absorber can be selected to substantially match these absorption bands to minimize yellowing.

By using these principles, the optimum balance of cure speed and non-yellowing can be achieved for a particular application by selecting the identity and amount of UV absorber together with selecting the identity and amount of photoinitiator in the coating system, including both inner and outer primary coatings. In some cases, non-yellowing of the inner primary coating may be more important, whereas in other cases, a fast cure speed in the outer primary coating may be more important. The UV absorber and photoinitiators can be adjusted according to the need.

Suitable types of UV absorbers include o-hydroxybenzophenone, o-hydroxyphenyl salicylate, cyanoacrylate, or 2-(o-hydroxyphenyl)benzotriazole types, or mixtures thereof. Other UV absorbers include those discussed in the publication, "Light Stabilization of UV Cured Coatings: A Progress Report" by A. Valet et al. in November/December 1996 Radtech Report, pgs. 18–22, which is hereby incorporated by reference. According to this publication, UV absorber types of compounds include hydroxyphenyl-benzotriazoles, hydroxyphenyl-s-triazines, hydroxybenzophenones, and oxalic anilides.

A radiation-polymerizable UV absorber is preferred. Preferably, the UV absorber comprises a (meth)acrylate functionality, and preferably, an acrylate. These UV absorbers allow the extractable content of the coating to be minimized.

Examples of UV absorbers include:
2,6-dihydroxybenzophenone,
2,2'-dihydroxybenzophenone,
2,2'-dihydroxy-4,4'-dimethoxybenzophenone,
2,4-dihydroxybenzophenone,
2-hydroxy-4-methoxybenzophenone,
2-hydroxy-4-octoxybenzophenone,
2-hydroxy-4,4'-dimethoxybenzophenone,
3-benzoyl-2,4-dihydroxybenzophenone,
2-hydroxy-4-dodecyloxybenzophenone,
2,2'-dihydroxy-4-n-octyloxybenzophenone,
phenyl salicylate,
p-octylphenyl salicylate,
p-t-butylphenyl salicylate
2-(2'-hydroxy-5'-methylphenyl)benzotriazole,
2-(2'-hydroxy-5'-t-butylphenyl)benzotriazole,
2-(2'-hydroxy-3',5'-di-t-butylphenyl)-5-chlorobenzotriazole
2-ethylhexyl-2-cyano-3,3'-diphenylacrylate, and
ethyl-2-cyano-3,3'-3,3'-diphenylacrylate.

A preferred example is 2 -ethyl,2'ethoxyoxalamide (Sandovur VSU). Another preferred example of a UV absorber which is radiation-curable is 2-hydroxy-4-acryloxyethoxy benzophenone (Cyasorb UV 416). Another preferred example is 2-(2'-hydroxy-5-methacryloxyethylphenyl)-2-benzotriazole (Norbloc 7966).

The UV absorber preferably has strong absorption bands between about 345 nm and 450 nm. It is important that the UV absorption extend up to and, preferably, into the visible light region (which begins at about 400 nm).

The amount of UV absorber can be about 0.01 wt. % to about 20 wt. %, and preferably, about 0.05 wt. % to about 5 wt. %, and more preferably, about 0.1 wt. % to about 2 wt. %.

Surprisingly, the UV absorbers of the present invention, when used in larger amounts, can be more effective than hindered amine light stabilizers such as Tinuvin 292 to reduce the yellowing rate.

In addition to the selection of the UV absorber, another important aspect of the present invention is the selection of the inner and outer primary coating photoinitiator system which involves consideration of the cure speed of the photoinitiator, its yellowing characteristics, its absorption spectra, and its amount. The photoinitiator system should be selected to allow for rapid production of optical fiber but also to not sacrifice substantial non-yellowing character. In one coating, mixtures of photoinitiators can provide the optimal amount of surface and through cure and are preferred. Photoinitiators are preferred which generate free radicals upon exposure to UV light.

Photoinitiators selected for use in the outer primary coating layer should absorb radiation in a region that to the extent possible does not substantially include the absorption range of the UV absorbing compound in the outer primary coating layer.

The total amount of photoinitiator in the inner or outer primary coating is not particularly limited but will be sufficient, for a given composition and application, to accelerate cure and achieve the non-yellowing and fast cure speed advantages of the present invention. The amount in one coating can be, for example, about 0.1 wt. % to about 20 wt. %, and preferably, about 0.5 wt. % to about 10 wt. %, and most preferably, about 1.0 wt. % to about 5.0 wt. %.

Mono- and bis-acyl phosphine oxide photoinitiators can be used and have been disclosed in, for example, U.S. Pat. Nos. 5,534,559; 5,218,009; 5,399,770; and 4,792,632, which are hereby incorporated by reference. Other photoinitiator types include those disclosed in, for example, U.S. Pat. No. 4,992,524.

Examples of free radical-type photoinitiators include, but are not limited to, the following:
hydroxycyclohexylphenylketone;
hydroxymethylphenylpropanone;
dimethoxyphenylacetophenone;
2-methyl-1-[4-(methyl thio)-phenyl]-2-morpholinopropanone-1;
1-(4-isopropylphenyl)-2-hydroxy-2-methylpropan-1-one;
1-(4-dodecyl-phenyl)-2-hydroxy-2-methylpropan-1-one;
4-(2-hydroxyethoxy)phenyl-2(2-hydroxy-2-propyl)ketone;
diethoxyphenyl acetophenone;
2-hydroxy-2-methyl-1-phenyl-propan-1-one;
2,4,6-trimethylbenzoyl diphenylphosphine oxide;
(2,6-dimethoxy benzoyl)-2,4,4 trimethylpentylphosphine oxide,
2-hydroxy-2-methyl-1-phenyl-propan-1-one; and mixtures of these.

For an outer primary coating, a preferred photoinitiator system is a mixture of 2,4,6-trimethyl benzoyl diphenyl phosphine oxide and 1-hydroxycyclohexylphenyl ketone.

For an inner primary coating, a preferred photoinitiator system is a mixture of bis(2,6-dimethoxybenzoyl)2,4,4'-trimethylpentyl) phosphine oxide and 2-hydroxy-2-methyl-1-phenyl-1-propanone.

Both inner and outer primary coatings generally comprise at least one radiation-curable oligomer. The radiation-curable oligomer can comprise an oligomer backbone, radiation-curable end-capping groups, and linking groups which join the end-capping groups to the oligomer backbone. For example, the radiation-curable oligomer can be prepared by reaction of a backbone oligomeric polyol compound, a polyisocyanate linking compound; and a radiation-curable end-capping compound. Block copolymer and random copolymer oligomer structures can be used.

The prior art discloses how to prepare suitable oligomers. For example, oligomer synthesis can be carried out by methods disclosed in, for example, U.S. Pat. No. 5,336,563, the complete disclosure of which is hereby incorporated by reference. Outer primary coatings are disclosed in, for example, U.S. Pat. Nos. 4,522,465 and 4,514,037 to Bishop et al, the complete disclosures of which are hereby incorporated by reference. U.S. Pat. No. 4,806,574 to Krajewski et al. also discloses methods for tailoring the molecular architecture of the oligomer by, for example, use of polyfunctional cores. U.S. Pat. No. 5,093,386 to Bishop et al. and U.S. Pat. No. 4,992,524 to Coady et al. also disclose oligomer synthetic strategies which can be used in the present invention.

The number average molecular weight of the oligomer can be, for example, about 750 g/mol to about 50,000 g/mol, and preferably, about 1,000 g/mol to about 10,000 g/mole, and more preferably less than about 5,000 g/mol. Molecular weight and its distribution can be determined by gel permeation chromatography.

The oligomer can be present in amounts between about 5 wt. % and about 95 wt. %, and preferably, between about 20 wt. % and about 80 wt. %, and more preferably, between about 30 wt. % and about 70 wt. % relative to the total composition.

The oligomer backbone can comprise, for example, polyether, polycarbonate, polyester, or hydrocarbon repeat units, or combinations thereof. Acrylated acrylics can be used. The backbone structure in the oligomer can be derived from one or more oligomeric polyol compounds having the above-noted repeat units.

Polyether polyols which can help form the oligomer backbone can be prepared by ring-opening polymerization of cyclic ethers, as discussed in, for example, U.S. Pat. No. 4,992,524 to Coady et al. Oligomers comprising polyether backbones can also be used as disclosed in, for example, U.S. Pat. No. 5,538,791. Polyether-type oligomers which are silicone modified are also disclosed in, for example, EP Patent Publication No. 0,407,004 (A2).

Polyether repeat units can be based on, for example, C2–C6 alkyleneoxy repeat structures. Representative polyether structures include ethyleneoxy, propyleneoxy, and tetramethyleneoxy repeat units. Substituents such as methyl or ethyl or other alkyl or substituted alkyl groups can be included off of the polyether backbone to tailor properties.

Polycarbonate repeat unit structures can be, for example, based on polyalkylcarbonate structures. Examples of polycarbonates include those prepared by alcoholysis of diethylene carbonate with C2–C12 alkylene diols such as, 1,4-butane-diol, 1,6-hexane diol, 1,12-dodecane diol, and the like. The polycarbonate structures in an oligomer can be tailored by inclusion of polyether units.

In addition, hydrocarbon or polyolefin oligomer backbones can be used as disclosed in, for example, U.S. Pat. Nos. 5,146,531 and 5,352,712. Unsaturated or saturated hydrocarbon polyols can be used, although saturated ones are preferred. Hydrogenated polybutadiene is a preferred example.

Polyester diols include the reaction products of polycarboxylic acids, or their anhydrides, and diols. Acids and anhydrides include, for example, phthalic acid, isophthalic acid, terephthalic acid, trimellitic acid, succinic acid, adipic acid, sebacic acid, malonic acid, and the like. Diols include, for example, 1,4-butanediol, 1,8-octanediol, diethylene glycol, 1,6-hexane diol, dimethylol cyclohexane, and the like. Included in this classification are the polycaprolactones. Polyester backbones, however, are less preferred because they tend to cause hydrolytic instability.

The oligomer also comprises linking units such as urethane linkages formed by reaction of a polyol with a polyisocyanate. The polyisocyanate linking group can either link the polyol backbone compound to itself, another polyol backbone compound, or a radiation-curable end group compound. Preferably, the polyisocyanate linking group is a diisocyanate compound, although higher order isocyanates can also be used such as, for example, triisocyanates. For the inner primary coating, the polyisocyanate is also preferably aliphatic although some aromatic polyisocyanates can be included. In general, aromatic isocyanate compounds have been associated with yellowing, although the person skilled in the art can determine whether relatively small amounts of aromatic groups can be tolerated in a given composition. Aromatic isocyanates can be more readily used in an outer primary coating because those coatings are generally less susceptible to yellowing.

The polyisocyanate compound can have, for example, 4–20 carbon atoms. The molecular weight of the polyisocyanate can be less than about 1,000 g/mol, and preferably, less than about 500 g/mol. Polymeric polyisocyanates can, in some cases, be useful.

Examples of diisocyanates include diphenylmethylene diisocyanate, hexamethylene diisocyanate, cyclohexylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and polyalkyloxide and polyester glycol diisocyanates such as polytetramethylene ether glycol terminated with TDI, polyethylene adipate terminated with TDI, and tetramethylxylylene diisocyanate (TMXDI) respectively.

Urethane linkages in the oligomer can be generated with known urethanation catalysts such as, for example, dibutyltin dilaurate or diazabicyclooctane crystals.

The oligomer further comprises a radiation-curable end-capping group. End-capping means that the oligomer contains a terminal point on its molecular chain. The oligomer can have two to four end-capping sites, but preferably has two sites. In general, the oligomer can be formed from a monoethylenically unsaturated compound of relatively low molecular weight less than, for example, 500 g/mol, and preferably, less than about 300 g/mol. (Meth)acrylate compounds can be used in oligomer synthesis and function to end-cap the oligomer and provide unsaturation suitable for rapid radiation-cure, and in particular, ultraviolet light radiation-cure. The (meth)acrylate is preferably selected to maximize cure speed and allow for ready oligomer preparation. Acrylate is most preferred. In addition, however, non-acrylate systems such as vinyl ether and maleate can be used.

Hydroxyalkyl acrylate compounds can also be used, and hydroxyethyl acrylate is a particularly preferred compound. Other preferred examples include hydroxypropyl acrylate and hydroxybutyl acrylate.

For the inner primary coating, the oligomer can be a block copolymer oligomer prepared from a mixture of a polyether and a polycarbonate. For example, a mixture of polyols can be used which includes a (1) polyhexylcarbonate which also includes etheric repeat units, and (2) polybutylene oxide. For the outer primary coating, the polyol used to form the backbone is preferably a polypropylene glycol or a copolymeric polyether based on copolymerization of tetrahydrofuran and methyltetrahydrofuran.

For an outer primary coating, toluene diisocyanate is a preferred example of a linking group compound from which the oligomer is synthesized. For an inner primary coating, isophorone diisocyanate (IPDI) is a preferred example of a linking group compound.

Both inner and outer primary coatings further comprise at least one liquid reactive diluent, or monomer diluent, which functions to decrease the viscosity of the oligomer and tailor such properties in the cured composition as refractive index, modulus, and polarity. For example, aromatic diluents tend to raise the refractive index and Tg of the material. Long chain aliphatic diluents can soften the coating. Polar diluents can improve room temperature mechanical properties by hydrogen bonding and can increase solvent resistance. Preferably, formulations are tailored to minimize water absorption because water generally has a detrimental impact on fiber. Mixtures of diluents are preferred to achieve the suitable balance of properties required for a given application.

Preferably, the functional group present in the reactive diluent is capable of copolymerizing with the radiation-curable functional group present on the radiation-curable monomer or oligomer. More preferably, the radiation-curable functional group forms free radicals during curing.

The total amount of diluent can be, for example, about 5 wt. % to about 95 wt. %, and preferably, about 20 wt. % to about 80 wt. %, and more preferably, about 30 wt. % to about 70 wt. %.

For example, the reactive diluent can be a monomer or mixture of monomers having an acrylate or vinyl ether functionality and an $C_4$–$C_{20}$ alkyl or polyether moiety. Particular examples of preferred reactive diluents include:
hexylacrylate,
2-ethylhexylacrylate,
isobornylacrylate,
decyl-acrylate,
laurylacrylate,
stearylacrylate,
2-ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone, and the like.

Another type of reactive diluent that can be used is a compound having an aromatic group. Particular examples of reactive diluents having an aromatic group include:
ethyleneglycolphenylether-acrylate,
polyethyleneglycolphenyletheracrylate,
polypropyleneglycolphenylether-acrylate, and
alkyl-substituted phenyl derivatives of the above monomers, such as polyethyleneglycolnonylphenyletheracrylate.

The reactive diluent can also comprises a diluent having two or more functional groups capable of polymerization. Particular examples of such monomers include:
ethoxylated bisphenol-A-diacrylate—as available as SR 349A monomer and supplied by Sartomer,
$C_2$–$C_{18}$ hydrocarbon-dioldiacrylates,
$C_4$–$C_{18}$ hydrocarbondivinylethers,
$C_3$–$C_{18}$ hydrocarbon triacrylates, and the polyether analogues thereof, and the like, such as 1,6-hexanedioldiacrylate,
trimethylolpropane tri-acrylate,
hexanedioldivinylether,
triethylene-glycoldiacrylate,
pentaerythritol-triacrylate,
ethoxylated bisphenol-A diacrylate, and
tripropyleneglycol diacrylate.

A preferred diluent system for use in the outer primary coatings in the present invention is a mixture of ethoxylated nonylphenol acrylate and ethoxylated bisphenol A diacrylate. For an inner primary coating, a preferred diluent system is a mixture of ethoxylated nonylphenol acrylate and isodecyl acrylate.

Diluent molecular weight is not particularly limited but is generally below about 1,000 g/mol so that it is a liquid. The diluent, however, may itself contain some oligomeric character such as repeating etheric groups like ethyleneoxy or propyleneoxy. In this case, it may still be called a diluent.

The viscosity of the radiation-curable composition is preferably less than about 12,000 cps but greater than about 2,000 cps, and preferably, between about 3,000 cps and about 10,000 cps at ambient temperature. The viscosity is preferably stable over time so that long shelf life for the uncured composition is attained.

The inner and outer primary coating compositions can further comprise additives which are conventional in the optical fiber coating art. Suitable additives are disclosed in, for example, the aforementioned U.S. Pat. Nos. 5,336,563, 5,093,386, 4,992,524, and 5,146,531.

For example, adhesion promoters such as organofunctional silanes can be used in the inner primary coatings. Acrylate-, amino-, or mercapto-functional silane can be employed in amounts of about 0.1 wt. % to about 5 wt. %, and preferably, between about 0.3 wt. % and about 3 wt. %. Mercaptopropyltrimethoxy silane is a preferred example of a silane adhesion promoter.

Other suitable additives include thermal antioxidants such as hindered phenols or hindered amine light stabilizers. A preferred type of thermal antioxidant for both primary and secondary coatings is a thiodiethylene cinnamate derivative, Irganox 1035 available from Ciba-Geigy. The thermal antioxidant can be present, for example, in amounts between about 0.1 wt. % and about 1 wt. %.

Shelf stabilizers and slip agents can be important additives. For example, butylated hydroxy toluene and phenothiazine are commonly used stabilizing additives. Additives are also useful to tailor the handling characteristics of coated optical fiber. For example, slip agents and friction adjusting additives are useful in the outer primary coating. Still other additives or components which may appear in the final coating include pigments, catalysts, lubricants, wetting agents, and leveling agents.

Conventional colorants, dyes, and pigments can be used having conventional colors. Pigments are preferred over dyes because dye color tends to fade with time. Colorants are preferably stable to ultraviolet radiation, and pigments are in the form of small particles. Particle size can be reduced by milling.

The colored material can comprise oligomers, monomers and diluents, photoinitiators, stabilizers, and additives, as disclosed herein for substantially colorless coatings but adapted to be a printing ink binder, a colored outer primary coating, a colored matrix material, or the like.

Pigments can be conventional inorganic or organic pigments as disclosed in, for example, *Ullmann's Encyclopedia of Industrial Chemistry*, 5th Ed., Vol. A22, VCH Publishers (1993), pages 154–155, the complete disclosure of which is hereby incorporated by reference. The pigment can be selected based on, for example, whether the composition is a printing ink or secondary coating. Printing inks will be more heavily pigmented.

General classes of suitable colorants include, among others, inorganic white pigments; black pigments; iron oxides; chromium oxide greens; iron blue and chrome green; violet pigments; ultramarine pigments; blue, green, yellow, and brown metal combinations; lead chromates and lead molybdates; cadmium pigments; titanate pigments; pearlescent pigments; metallic pigments; monoazo pigments; disazo pigments; disazo condensation pigments; quinacridone pigments; dioxazine violet pigment; vat pigments; perylene pigments; thioindigo pigments; phthalocyanine pigments; and tetrachloroisoindolinones; azo dyes; anthraquinone dyes; xanthene dyes; and azine dyes.

More in particular, suitable inorganic pigments for printing inks include, for example, titanium dioxide, iron oxide, iron silicate, iron cyan blue (or Prussian blue), aluminum powder, cooper-zinc allow powder, and carbon black. Suitable organic pigments for printing inks include, for example, diarylide yellow, diarylide orange, naphthol AS red, Rubin 4 B calcium salt, salts of basic dyes, phthalocyanine blue, reflex blue, phthalocyanine green, and polycyclic pigments. Fluorescent pigments can be used.

The amount of the colorant, pigment, or dye is also conventional and will be determined by such factors as the shade, coloring strength, and fastness of the colorant as well as the dispersibility, rheological properties, and transparency. Also, printing inks are generally more heavily pigmented than outer primary coatings. The amount can be that which is sufficient to impart the required color, and more than that is not generally preferred. The amount of colorant can be, for example, between about 0 wt. % and about 25 wt. %, and preferably, about 0.25 wt. % and about 15 wt. %, and more preferably, between about 0.5 wt. % and about 5 wt. %.

In a preferred embodiment for the present invention, an outer primary coating composition is formulated from a combination of pre-mixture ingredients comprising about 20 wt. % to about 40 wt. % of a radiation-curable oligomer, wherein the oligomer is prepared from hydroxyethyl acrylate, toluene diisocyanate, and a polyether polyol compound having molecular weight of about 750 g/mol to about 2,000 g/mol, about 40 wt. % to about 80 wt. % of ethoxylated bisphenol-A-diacrylate, about 3 wt. % to about 20 wt. % of ethoxylated nonylphenol acrylate, about 2 wt. % to about 4 wt. % of a photoinitiator system which includes at least one phosphine oxide type compound, and an effective amount of UV-absorber such as UV 416. In this preferred embodiment, an effective amount of antioxidant is also present.

In another preferred embodiment, an inner primary coating was formulated from pre-mixture ingredients comprising:

about 30 wt. % to about 70 wt. % of a radiation-curable oligomer, wherein the oligomer is prepared from (i) hydroxyethyl acrylate, (ii) isophorone diisocyanate, and (iii) a polyether polyol compound, a polycarbonate polyol compound, or a mixture thereof, wherein the oligomer has a molecular weight of about 750 g/mol to about 3,000 g/mol, about 5 wt. % to about 40 wt. % of ethoxylated nonyl phenol acrylate, about 5 wt. % to about 30 wt. % of isodecyl acrylate, about 2 wt. % to about 4 wt. % of a photoinitiator system which includes at least one phosphine oxide type compound, about 0.3 wt. % to about 3 wt. % of an organofunctional silane adhesion promoter, which preferably is mercaptopropyltrimethoxy silane, and an effective amount of UV-absorber such as UV 416. In this preferred embodiment, an effective amount of antioxidant is also present.

In addition to fast-cure speed and non-yellowing, other properties are also important. For example, the inner primary coating must have adequate adhesion to the fiber, even in moist conditions. However, the inner primary coating should also allow for a clean strip from the fiber in both fiber stripping and ribbon stripping processes. Both inner and outer primary coatings should be formulated to have resistance to moisture.

Cure speed for an outer primary coating should be less than about 1.0 J/cm$^2$, and preferably less than about 0.5 J/cm$^2$, and more preferably less than about 0.4 J/cm$^2$, wherein cure speed here means the dose at which modulus has reached 95% of its maximum value. Cure speed for an inner primary coating is also preferably less than about 1.0 J/cm$^2$.

Conventional optical fiber production methods can be used to prepare coated fiber. Such methods are disclosed in, for example, U.S. Pat. No. 4,962,992, which is hereby incorporated by reference.

The invention will be further illustrated with the following non-limiting examples. Unless otherwise indicated, percentages are weight percent and are with respect to the weight of the total composition.

EXAMPLE 1

Formulation of an Outer Primary Coating

A radiation-curable outer primary coating formulation is prepared from the pre-mixture ingredients summarized in Table I:

TABLE I

| INGREDIENTS | AMOUNTS (wt. %) |
|---|---|
| H-T-PPG1025-T-H[1] | 32.0 |
| ethoxylated bisphenol-A-diacrylate | 56.50 |
| ethoxylated nonylphenol acrylate | 7.00 |
| 2-hydroxy-4-acryloxyethoxy benzophenone (UV 416) | 0.5 |
| 2,4,6-trimethyl benzoyl diphenyl phosphine oxide | 0.5 |
| 1-hydroxy cyclohexyl phenyl ketone | 2.50 |
| thiodiethylene bis-(3,5-di-tert-butyl-4-hydroxy)hydrocinnamate | 0.5 |
| Ebecryl 170 | 0.5 |

[1]urethane acrylate oligomer prepared from (I) hydroxyethylacrylate (H), (II) toluene diisocyanate (T), and (III) polypropylene glycol diol with molecular weight of about 1,025 (PPG 1025).

The composition is expected to have both substantial non-yellowing behavior and fast cure speed.

EXAMPLE 2

Formulation of Inner Primary Coatings

A control inner primary coating composition without UV absorber was formulated from the pre-mixture ingredients summarized in Table II:

TABLE II

| INGREDIENTS | AMOUNTS |
|---|---|
| H-(T-PTGL2000)$_2$-T-H[1] | 50 |
| ethoxylated nonyl phenol acrylate | 20.4 |
| lauryl acrylate | 7 |
| vinyl caprolactam | 6 |
| isobornyl acrylate | 13.7 |
| 2,4,6-trimethylbenzoyl diphenyl phosphine oxide | 1.5 |
| Irganox 1035 | 0.3 |
| diethyl amine | 0.1 |
| mercaptopropyl trimethoxy silane | 1.0 |

[1]urethane acrylate oligomer prepared from hydroxyethyl acrylate (H), toluene diisocyanate (T), and a copolymer of THF and methyl-THF having molecular weight of about 2,000 (PTG-L 2,000).

The control formulation of Table II, which did not comprise UV-absorber, was further formulated into several additional compositions by the addition of additive so that the newly formulated compositions' concentration of additive was 0.5 wt. % (and 99.5 wt. % of composition in Table II).

The additive for composition A was Norblock 7966 [2-(2'-hydroxy-5-methacryloxyethylphenyl)-2H-benzotriazole]; for composition B was Sanduvor VSU (2-ethyl,2'-ethoxy-oxalamide), and for composition C was Tinuvin 292 (which is a hindered amine light stabilizer).

The three formulations, A–C, which each contained one additive, and the control formulation of Table II were converted to 3 mil films and cured by UV light (1.0 J/cm$^2$ under $N_2$ at 8 cfm with Fusion D lamp). The yellowness index was measured as a function of aging time under QUV conditions, and the results are shown in FIG. 1. Data was taken at 0, 1, 2, 3, 4, 6, and 8 weeks. The data showed surprisingly that Sandovur VSU was most effective for reducing the rate of yellowing.

EXAMPLE 3

Formulation of Inner Primary Coatings

Inner primary coatings were formulated according to Table III:

TABLE III

| INGREDIENTS | A | B |
|---|---|---|
| H-(I-PTGL2000)$_2$-I-H | 51.60 | — |
| H-(I-PPG1025)$_{1.06}$-(I-PERMANOLKM10-1733)$_{1.14}$-I-H | — | 56 |
| CH$_2$=CHCO(OCH$_2$CH$_2$)$_4$OC$_6$H$_4$C$_9$H$_{19}$ | 20.87 | 25.5 |
| LAURYL ACRYLATE | 7.007 | — |
| ISODECYL ACRYLATE | — | 14 |
| IRGACURE 1700 | — | 3 |
| PHENOXYETHYL ACRYLATE | 11.712 | — |
| N-VINYLPYRROLIDONE | 4.504 | — |
| IRGACURE 184 | 3 | — |
| IRGANOX 1035 | 0.3 | 0.5 |
| mercaptopropyl trimethoxy silane | 1.001 | 1.00 |

Figure 2:
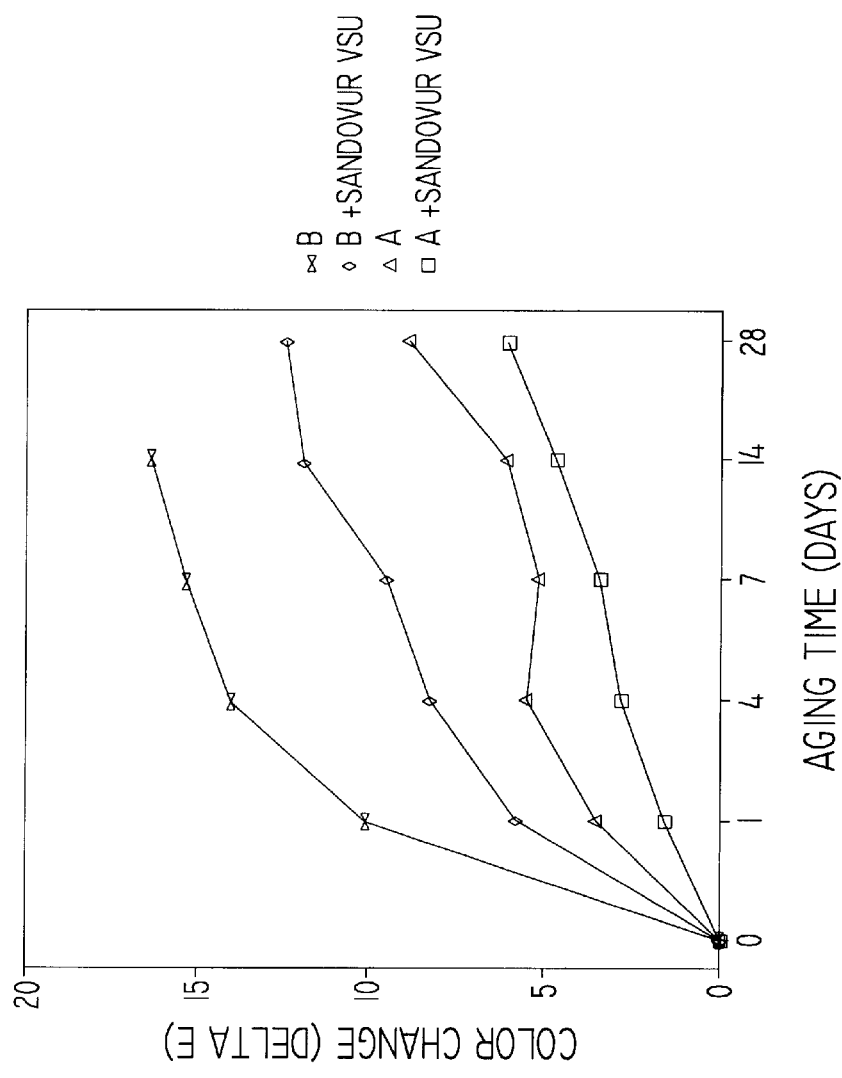

To 99.5% by wt. of each of the above compositions was added 0.5% by wt. SANDOVUR VSU. Film samples were prepared by coating and curing 10 mil films at 1.0 J/cm$^2$, under a D-lamp (Fusion) in the presence of $N_2$ and color change was measured at 0, 1, 4, 7, 14 and 28 days. Yellowness Index (YI) was calculated as described below, and delta E values estimated from the yellowness index. The results are provided in FIG. 2. Cured coating compositions containing 0.5% by wt SANDOVUR VSU consistently gave lower yellowness index and delta E values over a period of 28 days than the same compositions containing no UV absorbing compound.

Figure 3:
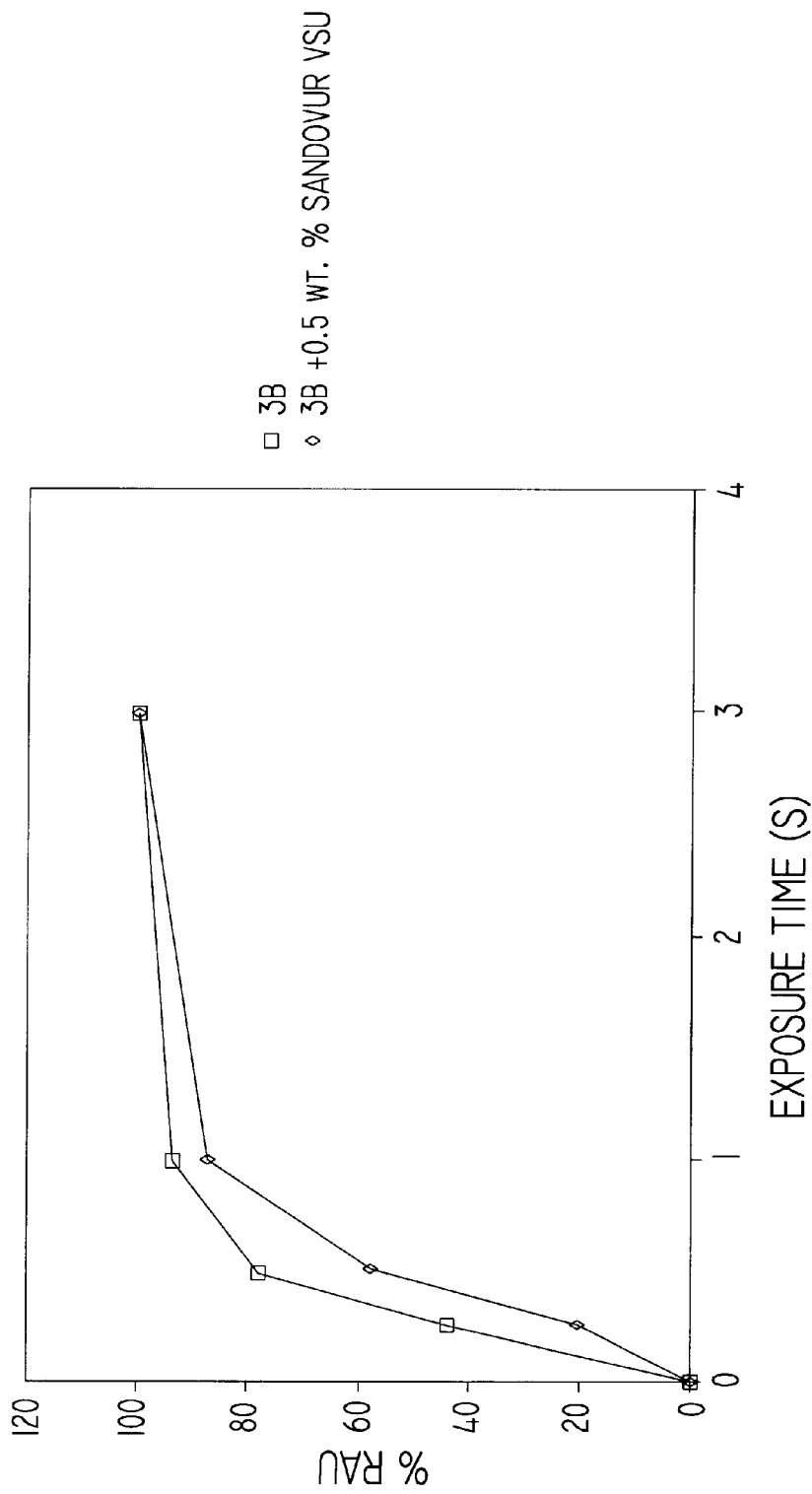
FIG. 3 illustrates the effect of UV absorber on cure speed for an inner primary coating.
Figure 4:
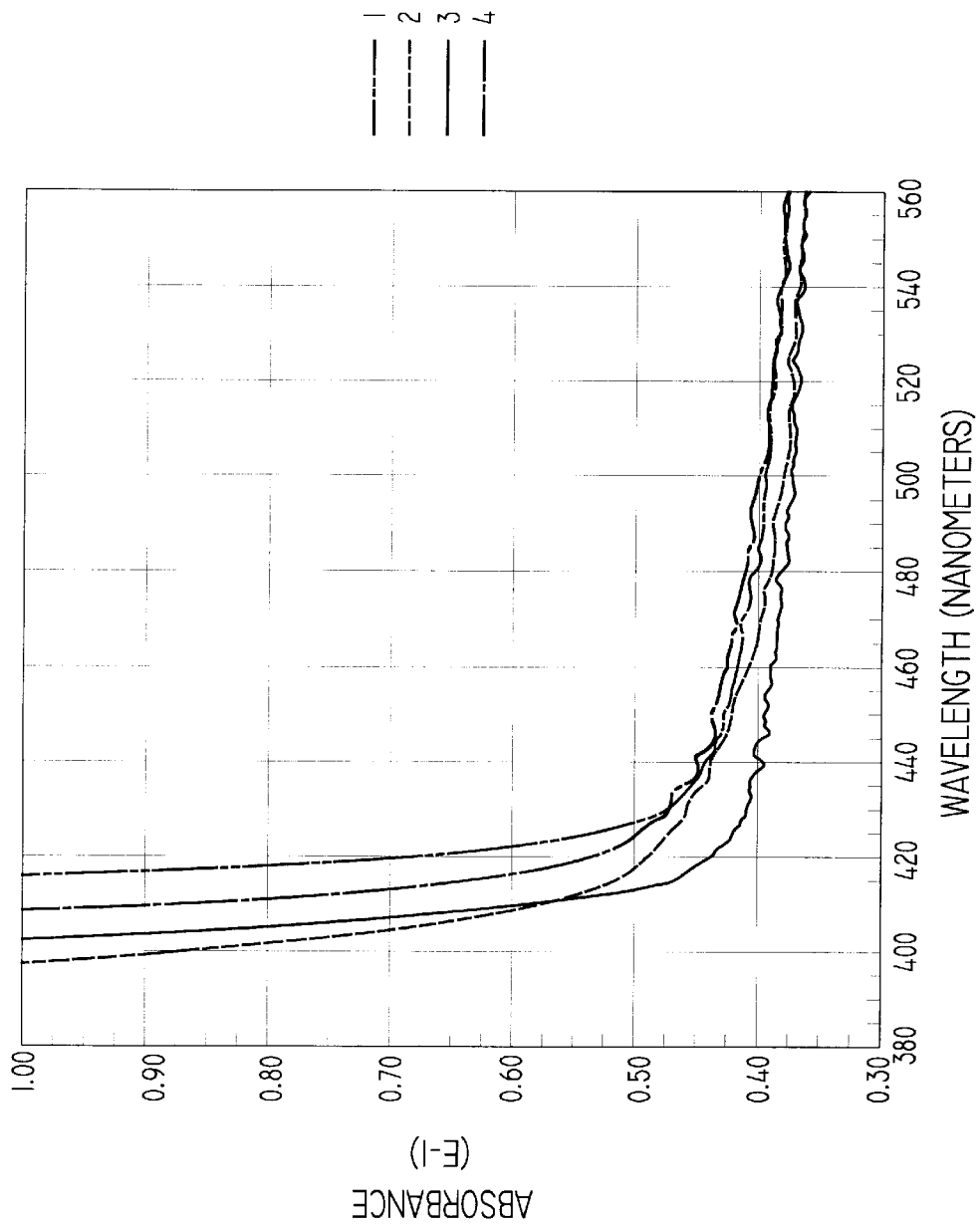
Figure 5:
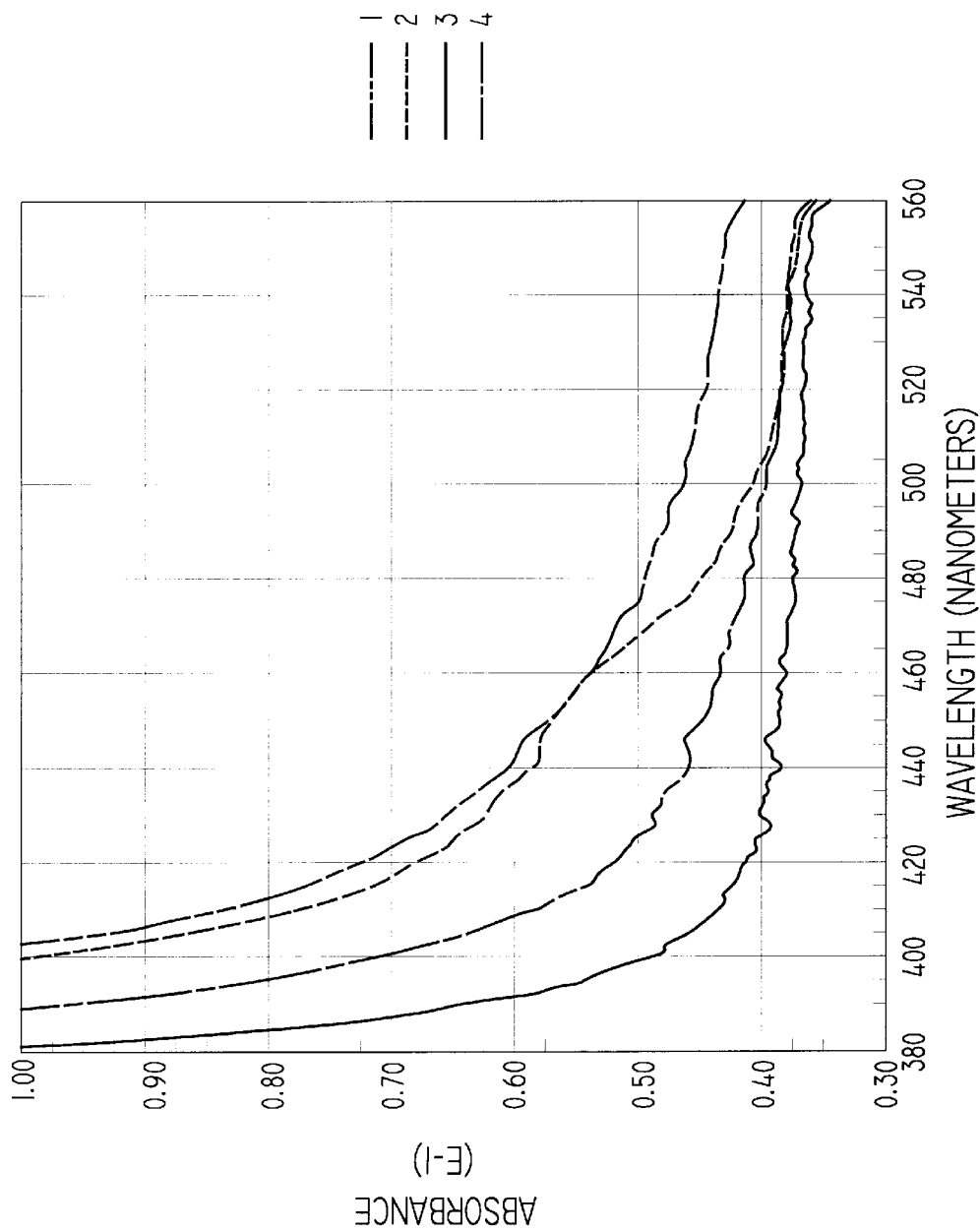
Figure 6:
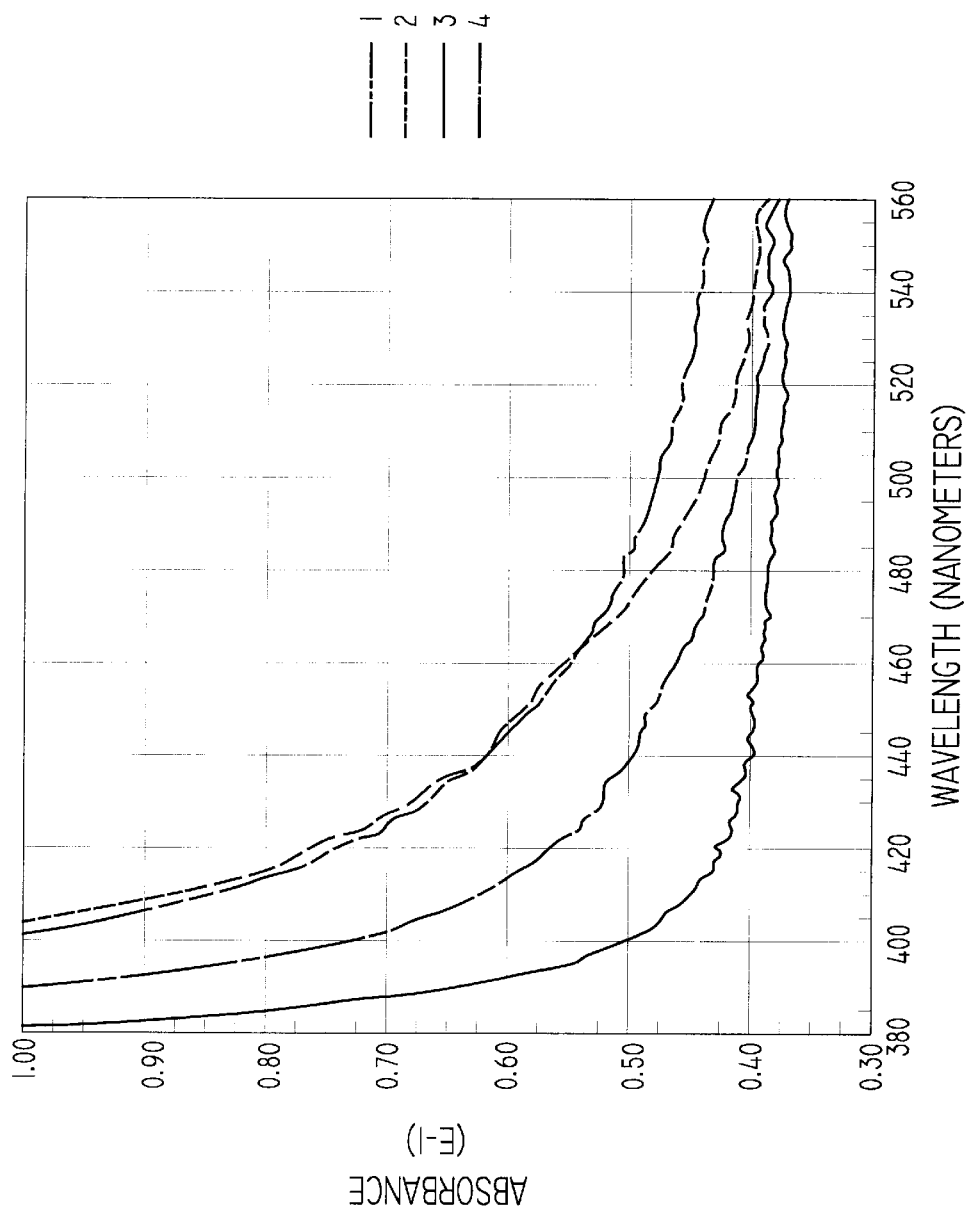

In addition, the effect of the UV-absorber, Sandovur VSU (0.5 wt. %), on the cure speed (measured by FT-IR measurements) of composition 3B is illustrated in FIG. 3. The data show that cure speed, although made slower, is not substantially impaired, and fast cure speed can be obtained despite the presence of the UV absorber which retards yellowing.

EXAMPLE IV

Cure of Inner Primary Coating Together with Outer Primary Coating Having UV Stabilizer Therein Two outer primary coating compositions were formulated from the following pre-mixture ingredients summarized in Table IV:

TABLE IV

| COMPONENTS | 4-A | 4-B |
|---|---|---|
| H-T-PTMG650-T-H[1] | 37.0 | 37.40 |
| Photomer 3016, bisphenol-A-epoxy diacrylate | 25.0 | 28.23 |
| tetraethyleneglycol diacrylate | — | 21.28 |
| triethyleneglycol diacrylate | — | 3.45 |
| trimethylolpropane triacrylate | — | 6.36 |
| hexanediol diacrylate | 10.5 | — |
| isobornyl acrylate | 12.0 | — |
| phenoxyethyl acrylate | 11.0 | — |
| benzophenone | — | 1.49 |
| 2,2-dimethoxy-2-phenylacetophenone, Irgacure 651 | — | 0.73 |
| 1-hydroxycyclohexyl phenyl ketone, Irgacure 184 | 1.0 | |
| 2,4,6-trimethylbenzoyl diphenylphosphine oxide, Lucirin TPO | 2.0 | |
| benzil | — | 0.5 |
| diethylamine | — | 0.60 |
| phenothiazine | — | 0.01 |
| thiodiethylene bis(3,5-di-tert-butyl-4-hydroxy) hydrocinnamate | 0.5 | — |
| 2-hydroxy-4-n-octoxybenzophenone | — | 0.01 |
| 2-hydroxy-4-acryloyloxyethoxy benzophenone | 0.5 | — |
| DC 57, silicone | 0.2 | 0.07 |
| DC 190, silicone | 0.3 | 0.13 |
| N-[2-vinylbenzoamino)-ethyl]-3-aminopropyltrimethoxysilane, 40% in MeOH | — | 0.19 |

[1]urethane acrylate oligomer prepared from hydroxyethyl acrylate (H), toluene diisocyanate (T), and polytetramethylene glycol having molecular weight of about 650 (PTMG 650).

The formulation 4B included less UV absorber and did not comprise a fast cure phosphine oxide photoinitiator.

In addition, four inner primary coating compositions 4C–F were formulated from pre-mixture ingredients which are summarized below in Tables V and VI:

TABLE V

| COMPONENTS | 4-C | 4-D |
|---|---|---|
| H-I-(PermanolKM101733-I)$_{2.7}$-H | — | 45.49 |
| H-I-(PTGL2000)$_2$-I-H | 52.7 | — |
| ethoxylated nonylphenol acrylate | 15.0 | 33.83 |
| Isodecyl acrylate | 7.0 | — |
| isobornyl acrylate | 14.0 | — |
| vinyl caprolactam | 7.0 | — |
| octyldecyl acrylate | — | 11.37 |
| tripropyleneglycol diacrylate | — | 1.96 |
| phenoxyethyl acrylate | — | 3.92 |
| trimethylbenzoyl diphenylphosphine oxide | — | 1.96 |
| 1-hydroxycyclohexyl phenyl ketone | 3.0 | — |
| ethylene bis(oxyethylene) bis(3-tert-butyl-4-hydroxy-5-methylhydrocinnamate) | — | 4.0 |
| thiodiethylene bis(3,5-di-tert-butyl-4-hydroxy) hydrocinnamate | 0.3 | — |
| mercaptopropyl trimethoxy silane | 1.0 | 0.98 |

TABLE VI

| Ingredients | 4-E | 4-F |
|---|---|---|
| H-(I-PTGL2000)$_2$-I-H | 52.7 | 52.7 |
| ethoxylated nonylphenol acrylate | 15.0 | 15.0 |
| isodecyl acrylate | 7.0 | 7.0 |

TABLE VI-continued

| Ingredients | 4-E | 4-F |
|---|---|---|
| isobornyl acrylate | 14.0 | 10.0 |
| vinyl caprolactam | 7.0 | 7.0 |
| tripropylene glycol diacrylate | — | 4.0 |
| Lucirin TPO | 2.0 | 2.0 |
| Irgacure 184 | 1.0 | 1.0 |
| Irganox 1035 | 0.3 | 0.3 |
| mercaptopropyl trimethoxysilane | 1.0 | 1.0 |

Tests were carried out to test the curing of the four inner primary coatings (Tables V and VI) under the outer primary coatings (Table IV). These tests simulated a wet-on-wet optical fiber coating and cure process. Four samples comprising films of both inner and outer primary coatings were tested for yellowing and cure speed behavior:

| sample | inner primary/outer primary |
|---|---|
| 1 | 4-D/4-B |
| 2 | 4-C/4-A |
| 3 | 4-E/4-A |
| 4 | 4-F/4-A |

Based on visual observation of the stickiness of the coatings, inner primary coating composition in sample 3 cured more quickly than the inner primary composition in sample 2. This difference in cure speed can be attributed to the phosphine oxide photoinitiator present in the inner primary composition of sample 3 which provides fast cure speed despite the presence of the UV absorber in the outer primary coating.

In addition, yellowing behavior (yellowness index) was measured under fluorescent aging conditions.

The results are shown in FIGS. 4–7. The coating system having the least amount of UV absorber in the outer primary coating, sample 1, showed the greatest color change (yellowing). Hence, compositions of sample 1 showed unacceptable yellowing and did not provide a combination of fast cure and substantial non-yellowing which the present invention provides. The coating system of sample 3 showed the least color change.

EXAMPLE 5

Effect on Cure Speed of Outer Primary Coating

A base formulation, which did not comprise UV absorber, was formulated according to Table VII.

TABLE VII

| INGREDIENTS | AMOUNTS (wt. %) |
|---|---|
| H-T-PTGL1000-T-H[1] | 32.3 |
| ethoxylated bisphenol-A-diacrylate | 56.0 |
| ethoxylated nonylphenol acrylate | 8.2 |
| diphenyl 2,4,6-trimethyl benzoyl phosphine oxide | 1.0 |
| 1-hydroxy cyclohexyl phenyl ketone | 2.0 |
| thiodiethylene bis-(3,5-di-tert-butyl-4-hydroxy) hydrocinnamate | 0.5 |

[1]urethane acrylate oligomer prepared from (I) hydroxyethylacrylate (H), (II) toluene diisocyanate (T), and (III) PTGL1000 which is a polyether copolymer diol having repeat units of tetramethylene glycol and methyltetramethylene glycol and having molecular weight of about 1,000.

This base formulation was further formulated with different UV absorbers in different amounts according to Table VIII. Samples incorporating different UV absorbing agents were prepared by coating and curing 3 mil Mylar films at 0.2, 0.3, 0.5, 0.75, 1.0 and 2.0 J/cm$^2$, under a D-lamp (Fusion) in the presence of N$_2$.

Cure speed was measured by dose-modulus curves, and the results are presented in Table VIII, shown below:

TABLE VIII

| Ingredient | Sample 5-A | Sample 5-B | Sample 5-C | Sample 5-D | Sample 5-E |
|---|---|---|---|---|---|
| Base | 100 | 99.5 | 99.5 | 99 | 99.04 |
| UV 416 | — | 0.5 | — | — | 0.96 |
| UV 531 | — | — | 0.5 | 1.0 | — |
| Cure Speed**, J/cm$^2$ | 0.35 | 0.43 | 0.36 | 0.42 | 0.51 |

**Dose at 95% of ultimate modulus

CYASORB UV 531 reduced cure speed of the base formulation less than CYASORB UV 416, and concentrations of about 0.5 wt % UV absorber reduced cure speed less than concentrations of about 1.0 wt %.

Test Procedures

Yellowness Index

Yellowness Index was calculated by UV-VIS spectroscopy. Yellowness index is measured as the average absorbance over the 350–450 nm UV spectral region, calculated at a 0.1 mm film thickness.

A specimen from a prepared coating film is cut and should be at least 0.5"×1.0" in size. The seam region is set between 350–450 nm at a speed of 60 nm/min. When placing the film in the sample holder, care should be taken to avoid wrinkling of the film. The film should be as smooth as possible before seaming. The spectrum should be collected at data point per nm. The coating film thickness in mm should be measured with a micrometer by taking the average of at least three different readings in the area of the film that was covering the hole in the sample holder.

The average absorbance ($A_{Avg}$) for the region scanned in the spectrum is calculated by scanning the absorbance at each measured wavelength and dividing by the number of data points. Yellowness index is calculated by adjusting the average absorbance to a film thickness of 0.10 mm according to the following equation:

$$YI = \frac{A_{Avg} \times 0.1}{T}$$

when
  YI=yellowness index
  $A_{Avg}$=average absorbance

T=film thickness in mm.

Cure Speed by FTIR

Cure speed in the present invention can be measured by FTIR. This method is applicable to coating systems that cure by loss of double bonds when exposed to ultraviolet light. Samples are prepared by placement of a drop of thoroughly mixed coating in the center of an NaCl disc. A second NaCl disc is placed on top of the coating drop such that the coating spreads evenly to the edge of the spacer. Care should be taken to ensure that no air bubbles are present in the coating layer. An FTIR spectrum of the uncured coating is obtained. The net absorbance of the unsaturation band from the peak minimum to the peak maximum is measured. The peak maximum should be in the 1.0–1.2 angstrom range. The absorbance will depend on the peak minimum. This step is repeated twice and the three values for net absorbance averaged. The averaged value is used for a target for analyses for a particular coating system. The coating thickness is adjusted by tightening the demountable cell holder screws until the net absorbance of the unsaturation band is within ±0.05 angstroms of the averaged value of the net absorbance. Spectra should be collected sequentially until the net absorbance value stabilizes, e.g., does not vary by more than ±5% on a relative basis for success of spectrum. The coating is then exposed to a 0.5 second pulse from the UV lamp source, then a second FTIR spectrum is immediately collected. This step is repeated until the coating has been exposed for a total time of 5.0 seconds, performing each successive exposure and FTIR measurement as quickly as possible.

All spectra obtained should be converted from transmission to absorbance. For each spectrum, the net area under the unsaturation band is determined. For acrylate based coatings, the percent reacted acrylate unsaturation (% RAU) for each exposure is as follows:

$$\% \ RAU = \frac{A_{(liq)} - A_{(exposed)}}{A_{(liq)} \times 100}$$

where $A_{(liq)}$ equals the net area of the 810 cm$^{-1}$ band for the liquid coating and $A_{(exposed)}$ equals the net area of the 810 cm$^{-1}$ band after exposure. The average % RAU for the triplicate analysis is determined for each time exposure and time of exposure v. % RAU for both the sample and the control is plotted.

Dose-Modulus Curves

Cure speed can also be measured by dose-modulus curves, as shown in FIGS. 8–12, for Examples 5A–5E, respectively (see Table VIII). Modulus measurements are secant modulus measurements which are described further below. Cure speed is the dose at which 95% of the maximum modulus was attained.

Tensile Testing

The tensile strength of cured samples was tested using a universal testing instrument, Instron Model 4201 equipped with a personal computer and software "Series IX Materials Testing System." The load cells used were 2 and 20 pound capacity. The ASTM D638M was generally followed, with the following modifications.

A drawdown of each material to be tested was made on a glass plate and cured using a UV processor. The cured film was conditioned at 23±2° C. and 50±5% relative humidity for a minimum of sixteen hours prior to testing.

A minimum of eight test specimens, having a width of 0.5±0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate.

The average film thickness of the test specimens was determined. At least five measurements of film thickness were made in the area to be tested (from top to bottom) and the average value used for calculations. If any of the measured values of film thickness deviates from the average by more than 10% relative, the test specimen was discarded. All specimens came from the same plate.

The appropriate load cell was determined by using the following equation:

$$[A \times 145] \times 0.0015 = C$$

Where: A=Product's maximum expected tensile strength (MPa); 145=Conversion Factor from MPa to psi; 0.00015= approximate cross-sectional area (in$_2$) of test specimens; and C=lbs. The 2 pound load cell was used for materials where C=1.8 lbs. The 20 pound load cell was used for materials where 1.8 (C<18 lbs). If C>19, a higher capacity load cell was required.

The crosshead speed was set to 1.00 inch/min, and the crosshead action was set to "return at break". The crosshead was adjusted to 2.00 inches jaw separation. The air pressure for the pneumatic grips was turned on and adjusted as follows: set approximately 20 psi(1.5 Kg/cm$^2$) for primary optical fiber coatings and other very soft coatings; set approximately 40 psi(3 Kg/cm$^2$) for optical fiber single coats; and set approximately 60 psi (4.5 Kg/cm$^2$) for secondary optical fiber coatings and other hard coatings. The appropriate Instron computer method was loaded for the coating to be analyzed.

After the Instron test instrument had been allowed to warm-up for fifteen minutes, it was calibrated and balanced following the manufacturer's operating procedures.

The temperature near the Instron Instrument was measured and the humidity was measured at the location of the humidity gage. This was done just before beginning measurement of the first test specimen.

Specimens were only analyzed if the temperature was within the range 23±1.0° C. and the relative humidity was within 50±5%. The temperature was verified as being within this range for each test specimen. The humidity value was verified only at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested.

The calculation of tensile properties was performed automatically by the software package.

The values for tensile strength, % elongation, and secant modulus were checked to determine whether any one of them deviated from the average enough to be an "outlier." If the modulus value was an outlier, it was discarded. If there were less than six data values for the tensile strength, then the entire data set was discarded and repeated using a new plate.

Delta E

The color aging behavior (delta E) of the cured films can be measured by conventional methods as disclosed in the publication entitled "A Measurement of the Contribution of UV Cured Coatings and Ink Binders Towards Color Change of UV Cured Inks" by D. M. Szum in Radtech Europe '93 Conference Proceedings (papers presented at the Radtech Europe Conference held May 2–6, 1993), the complete disclosure of which is hereby incorporated by reference. This publication discloses measurements which were performed on three layer samples, whereas the samples of the present invention were single layers. The measurement involves a mathematical manipulation, FMC-2.

Yellowing measurements can be carried out with film samples about 2×2 inches square. Color measurement data was obtained from a Macbeth Series 1500 Color Measurement System (Model 2020). The colorimeter was calibrated and set to the following parameters:

Illuminant: D for Primary and Secondary Illuminants

Color Difference: FMC-2

Mode: 2, COL

Area of Measurement: Large Area View

Specular Component: Excluded (SCE)

UV filter: Included

Background: White calibration standard.

Also, delta E measurements can be correlated with yellowness index measurements, and calibration plots can be prepared which allow one to estimate delta E based on yellowness index.

What is claimed is:

1. A coated optical fiber comprising the combination of:

an optical fiber a radiation-cured inner primary optical fiber coating, and a radiation-cured outer primary optical fiber coating, wherein said outer primary optical fiber coating comprises, before radiation-cure, the following combination of pre-mixture ingredients:

about 5 wt. % to about 95 wt. % of at least one radiation-curable urethane acrylate oligomer, about 5 wt. % to about 95 wt. % of at least one reactive diluent, about 0.1 wt. % to about 20 wt. % of at least one photoinitiator, wherein said photoinitiator is selected to provide a fast cure speed, and about 0.1 wt. % to about 20 wt. % of at least one UV absorbing compound which does not substantially impair the fast cure speed of the inner or outer primary coating.

2. The coated optical fiber of claim 1, wherein said amount of UV absorber is at least 0.3 wt %.

3. The coated optical fiber of claim 1, wherein said amount of UV absorber is at least 0.5 wt %.

4. The coated optical fiber of claim 1, wherein said outer primary coating is cured sufficiently to achieve at least 90% of its maximum modulus.

5. A coated optical fiber according to claim 1, wherein said inner primary coating comprises at least one UV-absorbing compound.

6. A coated optical fiber according to claim 5, wherein said inner primary coating comprises at least one urethane acrylate oligomer, at least two monomer diluents, and at least two photoinitiators, wherein at least one of said photoinititiators is a phosphine oxide compound.

7. A coated fiber according to claim 1, wherein said UV-absorber has ethylenic unsaturation.

8. A coated fiber according to claim 6, wherein said inner primary coating UV absorber and said outer primary UV absorber each have ethylenic unsaturation.

9. A coated fiber according to claim 8, wherein the amounts of said UV absorbers are at least about 5 wt. %.

10. The coated optical fiber of claim 1, wherein said outer primary coating comprises a phosphine oxide photoinitiator.

11. The coated optical fiber of claim 1, wherein said UV absorbing compound comprises a radiation-curable group.

12. The coated optical fiber of claim 1, wherein said outer primary coating comprises at least two UV absorbing compounds.

13. The coated optical fiber of claim 1, wherein said outer primary coating has a cure speed of less than 0.6 J/cm$^2$.

14. The coated optical fiber of claim 1, wherein said outer primary optical fiber coating further comprises an antioxidant.

15. The coated optical fiber of claim 1, wherein said outer primary optical fiber coating further comprises a hindered phenol antioxidant.

16. The coated optical fiber of claim 1, wherein said outer primary optical fiber coating further comprises a thiodiethylene cinnamate derivative antioxidant.

17. The coated optical fiber of claim 14, wherein said outer primary optical fiber coating comprises at least two photoinitiators.

* * * * *